United States Patent [19]

Hinshaw et al.

[11] Patent Number: 5,398,945
[45] Date of Patent: Mar. 21, 1995

[54] PISTON RING OF "Y" CROSS-SECTION

[75] Inventors: Rodney C. Hinshaw; William E. Martus, both of Richmond, Ind.

[73] Assignee: Dana Corporation, Toledo, Ohio

[21] Appl. No.: 975,024

[22] Filed: Nov. 12, 1992

[51] Int. Cl.6 .................................................. F16J 15/16
[52] U.S. Cl. ................................. 277/171; 277/206 R; 277/208; 277/216; 277/235 A
[58] Field of Search ...................... 277/171, 206 R, 208, 277/212 C, 214, 216, 225, 235 A, 236; 92/240

[56] References Cited

U.S. PATENT DOCUMENTS

| | | | |
|---|---|---|---|
| 1,449,615 | 3/1923 | McLeod | 277/216 |
| 1,773,749 | 8/1930 | Petersen . | |
| 1,891,424 | 12/1932 | Kirkpatrick | 277/236 X |
| 2,088,357 | 7/1937 | Wuestefeldt . | |
| 2,313,395 | 3/1943 | Phillips | 277/235 A X |
| 2,511,874 | 6/1950 | Phillips . | |
| 2,569,778 | 10/1951 | Phillips | 277/206 R |
| 2,865,694 | 12/1958 | Burnand . | |
| 2,893,800 | 7/1959 | Schmidt et al. | 277/171 X |
| 2,903,308 | 9/1959 | Barnhart | 277/171 X |
| 3,683,477 | 8/1972 | Sugahara | 277/235 A X |
| 3,843,138 | 10/1974 | Cobb . | |
| 3,926,166 | 12/1975 | Packard | 277/216 X |
| 4,515,378 | 5/1985 | Marshall . | |

FOREIGN PATENT DOCUMENTS

| | | | |
|---|---|---|---|
| 494123 | 5/1919 | France | 277/171 |
| 1361800 | 4/1964 | France . | |
| 1155295 | 10/1963 | Germany | 277/171 |

*Primary Examiner*—William A. Cuchlinski, Jr.
*Assistant Examiner*—Scott W. Cummings
*Attorney, Agent, or Firm*—Dykema Gossett

[57] ABSTRACT

A piston ring having a "Y" cross section is received within an annular groove of a piston which is reciprocable within a cylinder. The piston ring is formed from a single strip of material with an integral inner end. Two flanges extend laterally outwardly in opposed directions from an outer edge of the central leg. An outer end of each flange is yieldably urged against the wall of the cylinder to sealing engage the piston within the cylinder and force two circumferential ends of the ring into abutting engagement. The groove includes a radially inwardly extending portion to receive the central leg portion and a "V" shaped portion with inclined walls which each underlie one of the flanges.

15 Claims, 2 Drawing Sheets

PISTON RING OF "Y" CROSS-SECTION

FIELD OF THE MENTION

The present invention relates to a piston ring which has a unique cross-section to prevent passage of fluids.

BACKGROUND OF THE INVENTION

Piston rings are well known. They are usually received within an annular groove disposed about an outer periphery of a piston. In turn, the piston is reciprocable within a cylinder. A piston compresses fluids such as gases within a cylinder. In the case of an internal combustion engine, these fluids are ignited, and expand, forcing the piston away from the point of ignition. Conventional piston rings are not in total circumferential contact with the walls of a cylinder. Instead, there is an open-end clearance which results in the undesirable escape of fluids from the cylinder. This lowers efficiency and in some cases, as with internal combustion engines, adversely impacts the environment. Further, fluids such as gases may also bypass the portion of the ring received in the annular groove of the piston. Axially acting loads applied to the ring results in damaging wear to the ring and sides of the piston groove. Additional fluid may then bypass the ring.

Piston rings which sealingly engage a cylinder wall are known. In one such piston ring, several layers are riveted together to form the seal. Such sealing members, however, have been subject to a number of disadvantages. First, such piston rings are typically expensive to produce because of their complicated structures and constructions. Additionally, many such sealing members are difficult to install, increasing the time required for assembly. Even when correctly installed, such sealing members typically result in a high level of unwanted frictional interaction between the piston ring and the cylinder wall. This frictional interaction results in increased wear to both the sealing member and the cylinder wall with a corresponding reduced efficiency of the piston in operation.

BRIEF SUMMARY OF THE INVENTION

The present invention relates to a piston ring of a "Y" cross-section, and a method of making it.

According to the present invention, a piston ring of light weight with improved sealing characteristics is inexpensively produced using roll forming processes. The ring is comprised of a single strip of material which has a central leg with an integral inner end. In one embodiment, the central leg has two overlapping portions which are separated at a point spaced away from the inner end to form two flanges which extend laterally outwardly at an angle with respect to a remaining central leg portion. In a preferred embodiment, the outer end of each flange is treated for resistance to wear and friction.

The sealing member is received within an annular groove disposed about the outer periphery of a piston. The groove has a radially inwardly extending portion to receive the central leg portion of the ring, the circumferential ends of which abut when assembled into the cylinder. The groove also includes a radially outwardly extending "V" shaped portion defined by two inclined surfaces. Each surface underlies one of the flanges.

When the piston ring of this invention is assembled onto the piston and installed into the cylinder, the circumferential ends are abutted, forming an annular ring that is contiguous. This feature of the invention eliminates a path for escaping gases that is common to conventional piston rings. The free and unyielded outside diameter of the flanges is greater than the diameter of the cylinder into which they are assembled. Thus, it is the yielding of the "V" shaped flanges that permit assembly and increase sealing between the piston and cylinder surface.

An outer end of each of the flanges is yieldably urged against the cylinder wall when the piston is placed within the cylinder. In a preferred embodiment the flanges have a common length and a common, but opposite, angle with respect to the central leg. It is also intended that the flanges may come into selective contact with the inclined surfaces of the "V" shaped portion of the piston groove to further enhance the degree of sealing.

A piston ring made according to the present invention is easily adapted for use in a large number of applications, including internal combustion engines and compressors.

BRIEF DESCRIPTION OF THE DRAWINGS

The various features, objects, benefits, and advantages of the present invention will become more apparent upon reading the following detailed description of the preferred embodiments, along with the appended claims in conjunction with the drawings, wherein reference numerals identify corresponding components, and:

DETAILED DISCLOSURE OF A PREFERRED EMBODIMENT

Figure 1:
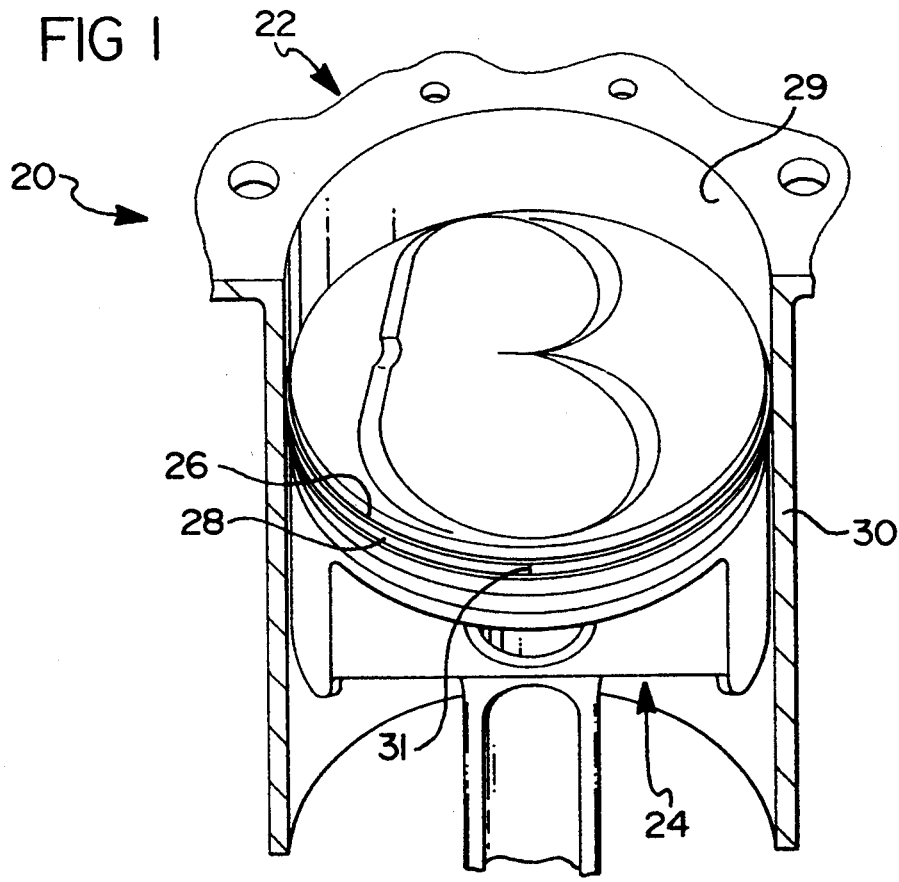
FIG. 1 illustrates a perspective fragmentary view of a piston and cylinder assembly according to the present invention.

An assembly 20 is illustrated in FIG. 1 which includes a cylinder 22 with an annular piston 24 reciprocable within the cylinder. Piston 24 includes an annular groove 26 disposed about an outer peripheral surface. A one piece annular piston ring or sealing member 28 is mounted within groove 26 to provide sealing engagement between piston 24 and an inner peripheral surface 29 of cylinder wall 30. In the shown assembled orientation, circumferential ends 31 of sealing member 28 are in abutting engagement with one another.

Figure 2:
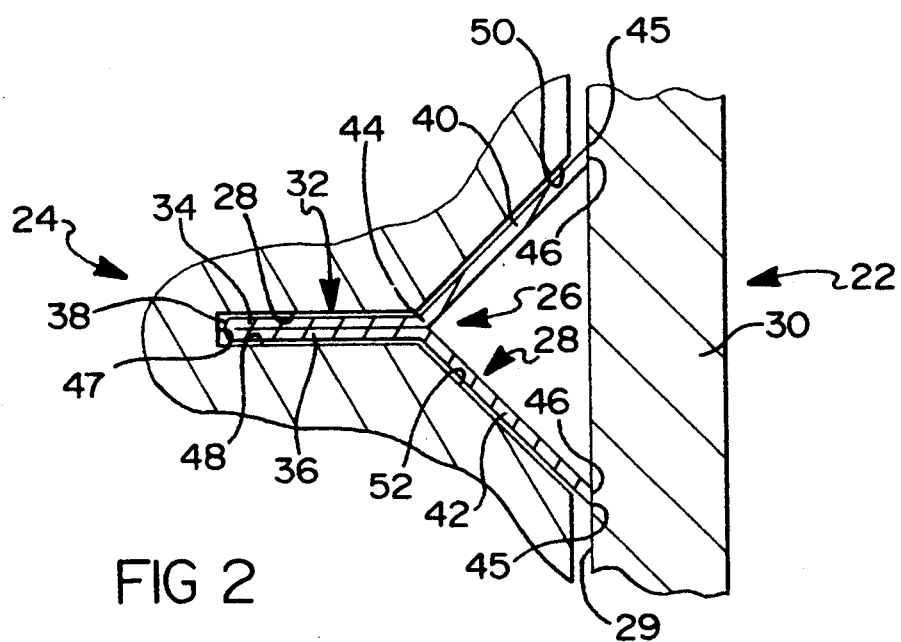
FIG. 2 is a cross-sectional view of a portion of the assembly of FIG. 1.

Shown in greater detail in FIG. 2, sealing member 28 is formed from a single strip of material such as steel, and includes a central leg 32 formed by two overlapping portions 34 and 36. Because central leg 32 is preferably formed by folding the strip of material, an integral, contiguous inner end 38 of central leg 32 results.

Two flanges, an upper flange 40 and a lower flange 42 extend laterally outwardly at an angle from an outer edge 44 of central leg 32, flange 40 extending from overlapping portion 34 and flange 42 extending from overlapping portion 36. Outer edge 44 is radially spaced outwardly of inner end 38.

In practice, as piston 24 reciprocates within cylinder 22, sealing member 28 reduces the blow-by of combustion gases. A key feature of the invention is the positive seal created between member 28 and inner surface 29 of cylinder wall 30 resulting from the total circumferential contact between the two. Sealing member 28 is assembled onto piston 24 and into cylinder 22 as a generally annular ring having two separate ends. As assembled, the ends of sealing member 28 are abutted, forming an annular ring that is contiguous at the ends. This feature of the invention eliminates a path for escaping gases that is common to conventional sealing members. The free and unyielded outside diameter of flanges 40 and 42 is greater than the inner diameter of the cylinder into which they are assembled. For assembly, flanges 40 and 42 are biased radially outwardly so that an outer end 45 of each is urged against inner surface 29 of cylinder wall 30. It is the yielding of the "V" shaped flanges that permit assembly and increase sealing between piston 24 and inner surface 29. The radially inward force against flanges 40 and 42 resulting from inserting piston 24 with sealing member 28 into cylinder 30 forces circumferential ends 31, shown in FIG. 1, into abutting engagement with one another in the assembled orientation. In the illustrated embodiment, each outer end 45 includes an outer end surface 46. End surface 46 is preferably a cylindrical surface centered about the annular axis of sealing member 28, parallel to inner surface 29. To prevent undesirable frictional effects between sealing member 28 and surface 29 while still providing the necessary sealing engagement, actual facial contact is limited as much as possible.

When piston 24 is forced downward as a result of fluid expansion, as from fuel-air ignition, flange 40 receives most of the resulting ring pressure. Flange 42 provides stability to the sealing member, and also assists with sealing around the inner diameter 47 of groove 26. Flange 42 also provides oil control when necessary by scraping residual oil downward along surface 29 of cylinder wall 30. In order for flange 42 to provide stability to sealing member 28 in operation, flanges 40 and 42 have a common length and share a common, but opposite, angle with respect to central leg 32. Thus, the outer end 45 of each flange is equally spaced radially outwardly of outer edge 44.

Groove 26 includes a radially inwardly extending portion 48 which receives central leg 32. Central leg 32 is preferably not secured within portion 48 since this might result in piston ring seizure. By folding the strip of material into overlapping portions 34 and 36, and the coiling thereof, there is a greater thickness at the inner diameter of central leg 32. The result is a keystone effect, reducing side clearance and providing a closer fit at inner diameter 47. This inhibits gases from passing between inner end 38 of sealing member 28 and inner diameter 47 of groove 26. Thus, an improved seal is provided which includes the adjoining ends of sealing member 28. Further, by having integral, contiguous inner end 38, no securing devices such as rivets are required. This further simplifies manufacture and assembly.

The closer fit also reduces wear between member 28 and groove 26. With conventional rings, inertial forces such as axially acting loads applied to the piston ring results in damaging wear to the ring and sides of the piston groove. Wear is also lessened because of the light weight of sealing member 8, which is formed from a single strip of material.

Groove 26 also includes a radially outwardly extending "V" shaped portion with two inclined surfaces 50 and 52. Each of these surfaces underlies one of flanges 40 and 42. These inclined surfaces help control the degree of sealing by affecting the deflection of the flanges. As piston 24 reciprocates up and down within cylinder 22, flanges 40 and 42, may flex with flange 40 coming into selective contact with surface 50 and flange 42 coming into selective contact with surface 52. Surfaces 50 and 52 may be positioned away from and inclined at an angle greater than that of flanges 40 and 42 in order to allow for the selected deflection of the flanges.

Sealing member 28 can be inexpensively produced using roll forming processes. The strip of material can be folded over to form overlapping portions 34 and 36. The strip can then be coiled to the proper diameter. Roll contour dies can then be used to form flanges 40 and 42. The strip is then cut off at the correct circumferential length and ends 31, shown in FIG. 1, brought into abutting engagement in the assembled orientation. Outer ends 45 may be ground down to form outer end surfaces 46.

Sealing member 28 is easily adapted for use in a large number of applications. A key factor in piston ring design involves the unit pressure exerted by the sealing member against the cylinder wall. It is desirable to achieve good conformability and a relatively small loss of unit pressure from less deflection due to cylinder and ring wear. Parameters which may be easily changed using the present invention include the material from which sealing member 28 is made, the load or tension function of the material chosen, its thickness, the length of central leg 32, flanges 40 and 42, and the amount of deflection permitted.

Figure 3:
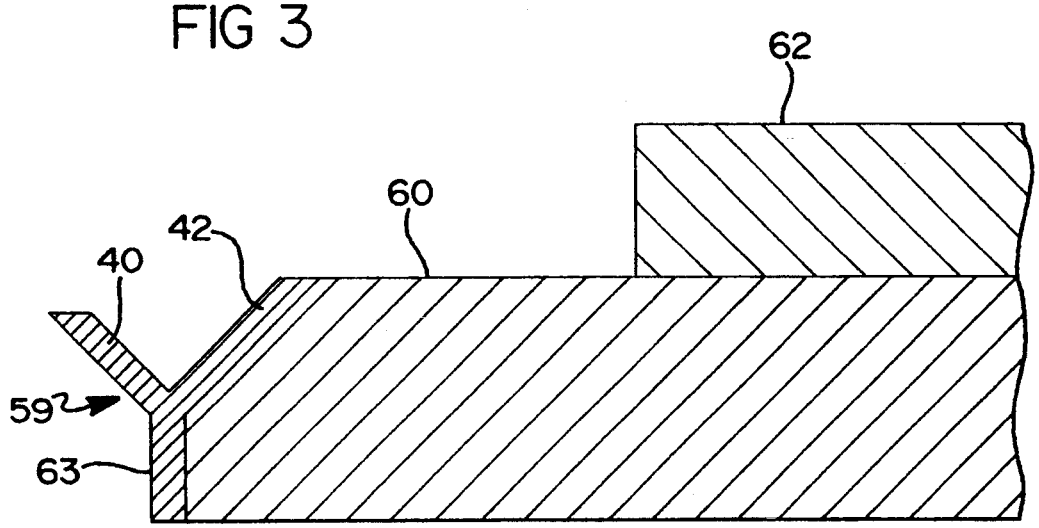
FIG. 3 is a cross-sectional view illustrating a second embodiment of a piston ring being made according to the present invention.
Figure 4:
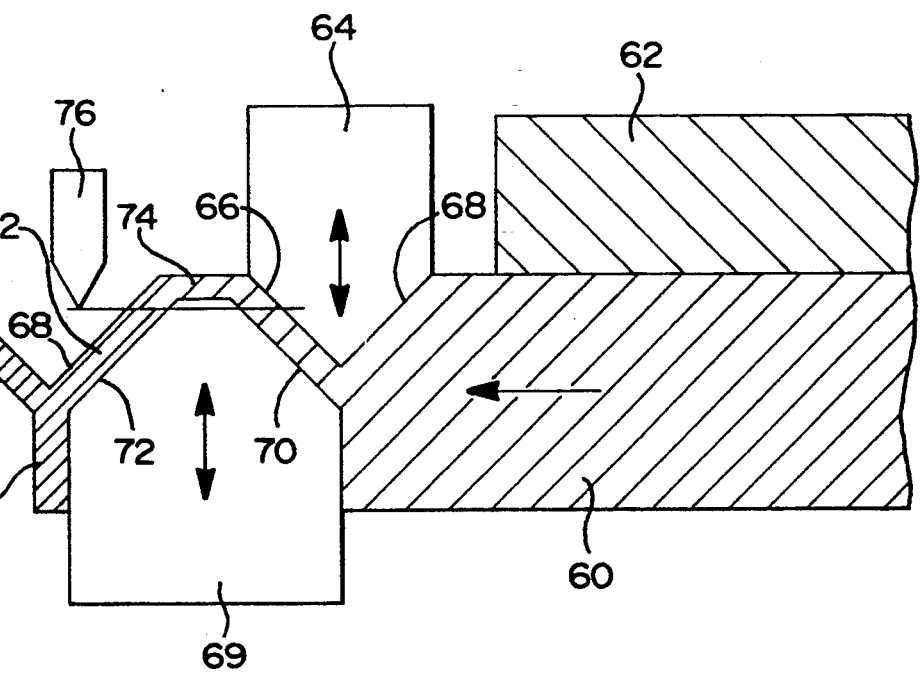
FIG. 4 is a cross-sectional view illustrating a method of making the embodiment of FIG. 3 in greater detail.

An alternative manufacturing embodiment for forming a sealing member 59 is illustrated in FIGS. 3 and 4. In FIG. 3, a tubular stock of material 60 having a thick cross-section is placed in a rotating machine chuck 62. This stock may be either cast iron or steel. Sealing member 59 is shaped so that it has flanges 40 and 42. Unlike in the embodiment of FIGS. 1 and 2, however, central leg 63 has a solid, integral cross-section in place of overlapping portions 34.

The procedure for making sealing member 59 is shown in greater detail in FIG. 4. Material 60 is fed through rotating machine chuck 62. As the material advances, an outer diameter plunge form tool 64 shapes outer inclined surfaces 66 and 68 of flanges 40 and 42 by removing material. Then, as material 60 continues to advance, an inner diameter plunge form tool 69 shapes inner inclined surfaces 70 and 72 of flanges 40 and 42 by removing material. A carrier strip 74 between successive sealing members 28 remains. A turning tool 76 separates sealing member 28 from strip 74. Finally, each sealing member is radially cut to form circumferential ends 31.

In practice, a sealing member is preferably formed from a clad steel including copper, in order to promote heat transfer to cylinder wall 30. This allows the sealing member to be used in a high temperature environment. To further increase the life of assembly 20, outer end 45 may be wear treated. Such treatments may include chromium plating and gas nitriding, but is not limited to these. Friction treatment may also be preferable. The strip of material can have the appropriate ends formed and be wear or friction treated before being shaped through roll forming processes.

Thus, while a preferred embodiment of the present invention has been described so as to enable one skilled in the art to practice the apparatus and method of the present invention, it is to be understood that variations and modifications may be employed without departing from the concept and intent of the present invention as defined in the following claims. Accordingly, the preceding description is intended to be exemplary and should not be used to limit the scope of the invention.

We claim:

1. A piston ring comprising:
    a single strip of metal formed into a split annular ring having two circumferential ends and a central leg, said leg being integral at an inner end;
    two flanges extending laterally outwardly from an outer edge of said central leg, said flanges extending at angles in opposed directions from each other and configured such that said flanges extend to a radial position intended to be greater than a radial dimension of an inner peripheral surface of a cylinder that is to receive said piston ring to force said circumferential ends into abutting engagement in an assembled orientation to make said ring contiguous and eliminate a path for escaping gases by a total circumferential contact between said ring and the surface of the cylinder.

2. A piston ring as recited in claim 1, wherein said central leg is formed by two overlapping portions of said strip, each of said flanges extending from an outer edge of each of said overlapping portions, said central leg having a greater thickness at said inner end because of said overlapping portions being coiled at said inner end to provide a closer fit between said central leg and a groove of a piston that receives said central leg to inhibit gases from passing between said central leg and the groove.

3. A piston ring as recited in claim 1, wherein said central leg has a solid, integral cross-section.

4. A piston ring as recited in claim 1, wherein said metal is clad steel including cooper, to promote heat transfer from said ring to the cylinder.

5. A piston ring as recited in claim 1, wherein said flanges have a common length and a common angle, but opposite, with respect to said central leg.

6. A piston ring as recited in claim 5, wherein a cylinder wall contact end of each said flange extends from a common point spaced radially outwardly of said inner end.

7. A piston ring as recited in claim 2, wherein said annular ring is centered about an axis, said ring having a cylinder wall contacting end including a cylinder wall contacting end surface, said surface being cylindrical and centered about said axis.

8. A piston ring as recited in claim 1, wherein a cylinder wall contact end of each said flange is treated for wear and friction.

9. An assembly comprising:
    a cylinder having an inner peripheral surface defining a bore;
    an annular piston reciprocable within said bore, said piston including an annular groove disposed about an outer peripheral surface; and
    a one-piece sealing member mounted in said groove to provide sealing engagement between said piston and said bore, said sealing member being formed from a single strip of metal and comprising a central leg formed by two overlapping portions and a flange extending laterally outwardly from each of said overlapping portions with an outer end of each said flange being in sealing engagement with said bore, said groove including a radially inwardly extending portion to receive said central leg and a radially outwardly extending "V" shaped portion with two inclined surfaces to each underlie one of said flanges, said central leg having a greater thickness at a radially inner end because of said overlapping portions being coiled at said inner end to provide a closer fit between said central leg and said groove to inhibit gases from passing between said central leg and said groove.

10. An assembly as recited in claim 9, wherein said outer end includes an outer end surface parallel to said bore.

11. An assembly as recited in claim 9, wherein said outer end of each said flange is continuously urged radially against said bore.

12. An assembly as recited in claim 9, wherein each said flange has a common length and a common, but opposite, angle with respect to said central leg.

13. An assembly as recited in claim 9, wherein said outer end is wear treated.

14. An assembly as recited in claim 9, wherein each said flange may flex and come into selective facial contact with one of said inclined surfaces during reciprocal movement of said piston within said cylinder.

15. An assembly as disclosed in claim 9, wherein said strip of metal comprises two circumferential ends, said circumferential ends brought into abutting engagement when said piston with said ring is assembled into said cylinder, making said sealing member contiguous and eliminating a path for escaping gases by a total circumferential contact between said sealing member and said bore.

* * * * *